Feb. 1, 1966     P. J. RICARD     3,232,052
POWER PRODUCING INSTALLATION COMPRISING A STEAM TURBINE
AND AT LEAST ONE GAS TURBINE
Filed Dec. 23, 1963     4 Sheets-Sheet 1

Feb. 1, 1966  P. J. RICARD  3,232,052
POWER PRODUCING INSTALLATION COMPRISING A STEAM TURBINE
AND AT LEAST ONE GAS TURBINE
Filed Dec. 23, 1963  4 Sheets-Sheet 4

United States Patent Office 3,232,052
Patented Feb. 1, 1966

3,232,052
POWER PRODUCING INSTALLATION COMPRISING A STEAM TURBINE AND AT LEAST ONE GAS TURBINE
Pierre Jean Ricard, Paris, France, assignor to Societe des Forges et Ateliers du Creusot, Paris, France, a company of France
Filed Dec. 23, 1963, Ser. No. 332,495
Claims priority, application France, Dec. 28, 1962, 920,104
6 Claims. (Cl. 60—39.18)

This invention has as its subject matter a power producing installation comprising a steam turbine and at least one gas turbine both producing power and is of use in installations using a gas cycle in which the enclosures of the steam generators are pressurised by compressors, the gas turbine exhaust heat being recuperated in the steam generator feed water.

It is an object of the invention to increase the power of the installation for a given steam turbine power and to improve efficiency.

According to the invention there is provided power producing installation comprising a steam activated power producing apparatus, at least one power-producing gas turbine arranged in an open gas cycle, steam generators, enclosures for the steam generators, air compressors arranged for pressurising said enclosures, and a half-closed cycle superimposed upon the open gas cycle, said half-closed cycle comprising a compressor, a power-producing turbine for driving the compressor, at least one recuperator for cooling the exhaust gases from the turbine with some of the feed water for the steam generator, the recuperator being connected for passing said cooled exhaust gases to said compressor, a combustion chamber for heating the cooled gases before they are expanded in the turbine, burners in the combustion chamber, means for supplying compressed air to the burners, such compressed air in operation, forming the entry flow into the half-closed cycle, the delivery flow from the half-closed cycle, in operation, being formed by gases which have been heated in the steam generator before being expanded in said at least one power producing gas turbine.

The installation according to the invention also comprises complementary means enabling the installation to operate at the full power of the steam turbine and of the gas turbine of the open cycle in the case of a stoppage of the compressors-and-turbine group of the half-closed cycle, the complementary means residing in that the recuperator of the half-closed cycle is disposed in the enclosure of the steam generator and is heated by auxiliary burners to which air is supplied by the compressor of the normal cycle when the group of the half-closed cycle is inoperative.

An embodiment by way of example of an installation according to the invention and a number of variants of the embodiment will be described hereinafter and are diagrammatically illustrated in the accompanying drawings wherein.

Figure 1:
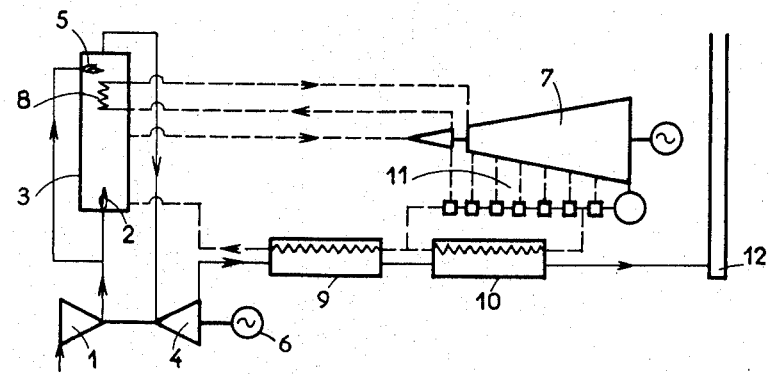
FIGURE 1 is a block schematic diagram of an installation comprising a simple gas cycle of known type without gas resuperheat.

FIGURE 1 is a diagram of an installation in which the gas cycle is a simple cycle without gas resuperheat. The cycle comprises a compressor 1 supplying air to natural-gas or fuel-oil burners 2 of a steam generator 3. The combustion gases depart therefrom at a temperature appropriate for entry into a gas turbine 4, the temperature being controlled by an after-combustion burner 5 disposed near the generator gas exit. The gas turbine 4 is coupled with a compressor 1 and drives an electric generator 6 or, if desired, any other power-absorbing machine. The steam which is superheated in the steam generator 3 supplies a steam turbine 7 and returns, if required, to a resuperheater 8 in the steam generator 3. The exhaust gases of the gas turbine 4 pass to a recuperator 9 where they yield some of their heat to the feed water of the generator 3, then to a recuperator 10 which acts as a partial substitute for water pre-heaters 11 heated by bled steam from the turbine 7. The exhaust gases from the gas turbine 4 are then exhausted through a chimney 12. The recuperator 10 can be embodied in a variety of ways. By way of example, FIGURE 1 illustrates a recuperator through which some of the condensed water from the first heater flows.

Figure 2:
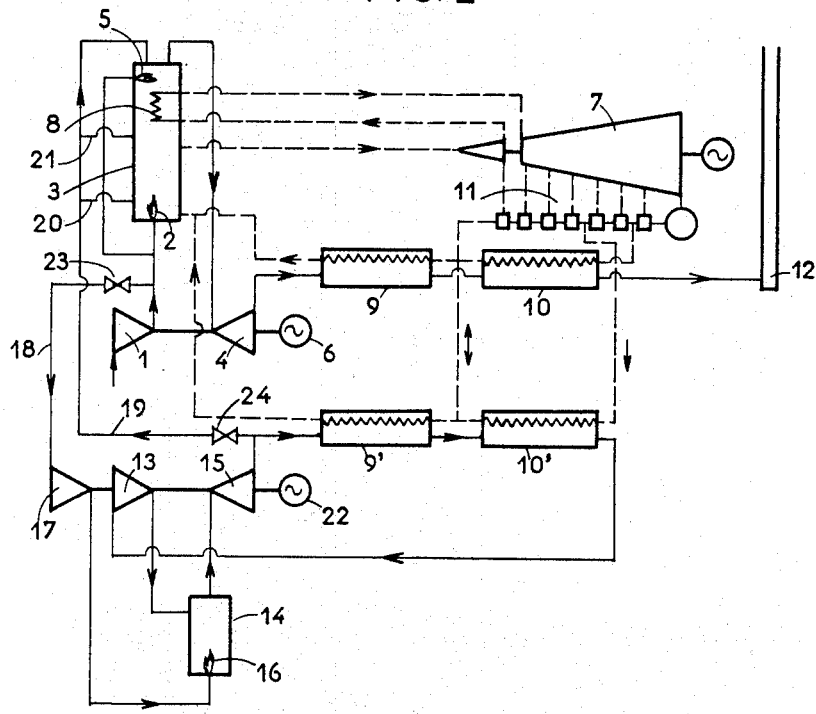
FIGURE 2 is a diagram showing an installation according to the invention in which a half-closed gas cycle is superimposed upon the gas cycle illustrated in FIGURE 1.

According to the invention, and as can be seen in FIGURE 2, a half-closed gas cycle is superimposed upon the open gas cycle illustrated in FIGURE 1. The gases performing the half-closed cycle are compressed by a compressor 13, then heated in a combustion chamber 14 to an appropriate temperature for entry into a gas turbine 15 which drives the compressor 13 and which is also coupled with a second compressor 17 and with an electric generator 22. After expansion in the turbine 15 the gases are cooled seratim in two recuperators 9', 10', through which some of the feed water of the steam generator 3 flows, whereafter the last-mentioned gases return to the intake of the compressor 13. The combustion chamber 14 is heated by burners 16 supplied with make-up air by the compressor 17 which receives through a passage 18 some of the air delivered by the compressor 1. The delivery of burnt gases corresponding to this make-up air leaves the half-closed cycle through a passage 19 and enters the post-combustion chamber of the steam generator 3 to be mixed with gases which have passed through the tube bundles of the superheaters (not shown) and of the resuperheater 8.

Except for load losses in the circuit, therefore, the exhaust pressure of the turbine 15 is the same as for gases of the steam generator 3. If required, variable proportions of the gas flow returning to the steam generator 3 through the passage 19 can enter either at a place 20 at the bottom of the combustion chamber or at a place 21 before the entry of the superheaters and of the resuperheater, so that the superheat and resuperheat temperatures can be varied, while the temperature in the combustion chamber and the amount of heat radiated to the water screens which protect the combustion-chamber walls can be reduced. The capacity of the post-combustion burners 5 is such that they can heat the gas mixture to an appropriate temperature for entry into the turbine 4.

For a given delivery of air to the compressor 1 and for a given quantity of fuel, the power of the recirculating gas-turbine group 17, 13, 15 is added to the power of the ordinary gas-turbine group 1, 4. The heat yield equivalent to this extra power is taken from the heat given to the steam turbine, but causes only a very slight reduction in the power thereof. There is therefore an increase in total power for the same power of the steam turbine.

Similarly, there is an improvement in efficiency despite the presence of the recuperator 10′ which takes the place of the steam turbine water preheaters. Efficiency is at a maximum when the gases are cooled in the recuperator 10′ to a temperature below the temperature of the gases which have passed through the recuperator 10. Consequently, the water feeding the recuperator 10′ is shown by way of example as being taken from the delivery of the third water preheater whereas the water feeding the recuperator 10 is taken from the delivery of the first preheater. However, these water take-off places can vary.

Figure 3:
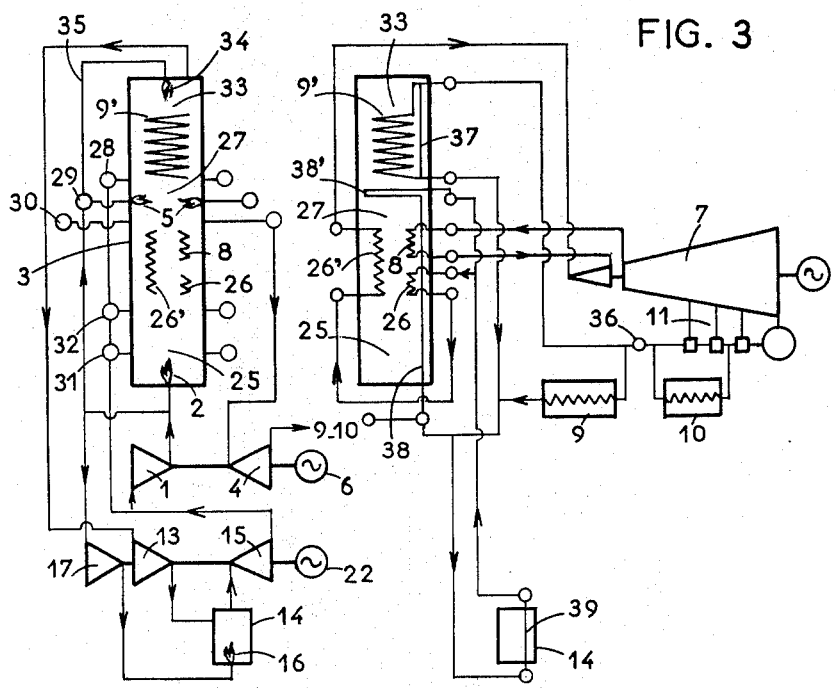
FIGURE 3 is a diagram of an installation according to the invention in which the steam turbine and gas turbine of the open cycle can operate at their maximum powers when the compressors-and-turbine group of the half-closed cycle is inoperative.

The power increase and the efficiency increase for a given steam turbine power are greater in proportion as the recirculation ratio K is greater—i.e., the ratio of the air volume equivalent to the gas volume entering the recuperators 9′, 10′ and the compressor 13, to the air volume returning initially to the compressor 1. K is increased by the preheaters being omitted completely at high temperatures of the steam turbine—as is shown in FIGURE 3 and as will be described hereinafter—and by the temperature differences between the gas and the water on the hot side of the recuperators 10 and 10′ being reduced for given temperature differences on the cold side. K should therefore be as high as is compatible with an economic construction of the recuperators 10, 10′.

The excess of air at the exit of the steam generator 3 and of the combustion chamber 14 can be low—some 10%—since all the burners 2, 5, 16 are supplied with pure air to ensure satisfactory combustion. The maximum value of K is greater in proportion as the excess of air of the combustion gases is smaller at the exit of the steam generator 3 and can be better than 1.4 for a 10% excess of air.

When K is at its maximum, the amount of heat exchanged in the recuperators 9, 9′ becomes considerable and may come close to the heat yielded to the steam in the steam generator 3. Consequently, the recuperators 9, 9′ have to vapourise most of the water and not just heat it. The steam generator 3 therefore receives a steam and water mixture and, although the invention does not exclude the use of natural circulation, the steam generator system best suited to the requirements of the invention is of the forced circulation kind without a tank for separating water and steam. The recuperators 9, 9′ must therefore be considered as forming part—like the steam generator 3—of a forced-circulation steam-producing system.

The combustion chamber 14 can be devised as an ordinary gas turbine chamber cooled by the gases delivered by the compressor 13. Advantageously, for satisfactory combustion the combustion chamber 14 is generously dimensioned and its walls are protected by water-screen tubes which participate in steam production and which, like the steam generator 3, are supplied with the steam and water mixture from the recuperators 9, 9′ as illustrated in FIGURE 3 which will be described hereinafter. This step also improves efficiency, since the volume of air supplied to the combustion chamber 14 increases, and it can be considered that this volume of air passes through the resuperheat cycle 1, 17, 14, 15, 3, 4, 9, 10, 12 which is superimposed upon the closed-circuit gases.

The economic advantages provided by the invention must not be impaired by poor availability of the installation due to mechanical accidents to the recirculation group 17, 13, 15, 22 or to soiling of the vanes of the units of the latter group, more particularly with regard to the compressor 13 if heavy fuel oil is used. A description will be given hereinafter of how the invention enables the steam turbine 7 and the ordinary gas turbine group 1, 4, 6 to operate at their maximum powers when the group 17, 13, 15, 22 is inoperative. In operation under these conditions, the power is reduced only to the extent corresponding to the stopped group and to the increased excess of air—i.e., some 10%—while efficiency is reduced by some 5%.

When the recirculation group is inoperative, the passages 18, 19 could be closed by valves 23, 24. However, quite apart from the fact that the valve 24 would have to be very large, although the flow through the passage 19 is relatively small—the cessation of heat exchange in the recuperator 9′ would unbalance the production of the steam generator 3 and the superheating, and the steam generator 3 would produce only a reduced amount of steam. The invention therefore comprises an extra feature which obviates these disadvantages and which is illustrated in FIGURE 3. For the sake of clarity therein, there are separate views of the gas circuit on the left and of the water and steam circuit on the right. The said feature is to place the tube bundle of the recuperator 9′ in the body of the steam generator 3.

The generator 3 comprises a combustion chamber 25, heated by the burners 2, superheaters 26, 26′, the resuperheater 8, a mixing chamber 27, the recuperator 9′ and a chamber 33. The mixing chamber 27 receives the gases which have passed through the superheaters 26, 26′ and the resuperheater 8, the exhaust gases of the turbine 15, whose entries are distributed by a circular header 28, and the air supplying the post-combustion burners 5, such air being distributed by a circular header 29. The mixture, once heated to the appropriate temperature by the burners 5, issues through a circular header 30 to enter the gas turbine 4 of the ordinary cycle. Variable proportions of the exhaust gas delivery from the turbine 15 can be injected via a circular header 31 into the combustion chamber 25 or via a circular header 32 into the entry of the superheaters 26, 26′. That proportion of the exhaust gas delivery of the gas turbine 15 which does not participate in the mixture in the chamber 27 and which is sucked in by the compressor 13 passes through the recuperator 9′; the water of the turbine feed water system 11 flows through the tube bundle of the recuperator 9′. The chamber 33 acts as combustion chamber when emergency burners 34 supplied with air through a line 35 by the compressor 1 are used. The complete arrangement could be reversed with the combustion chamber 25 at the top and with the chamber 33 at the bottom. If required, the resuperheater 8 and the low-temperature superheater 26 could be disposed in one generator body, and the high-temperature superheater 26″ can be disposed in another, to facilitate control of superheating and resuperheating. In such a case such body would comprise a recuperator section 9′ and the same combustion-chamber and mixing system.

As in the previous case, the high-temperature feed water heaters of the steam turbine are omitted and there are, for instance, only three feed water heaters through which a proportion of the condenser delivery flows, the other proportion of such delivery flowing through the recuperator 10. The total water delivery from the feed pump 36 is divided into two flows which are apportioned by an appropriate control, one such flow flowing through the recuperator 9 which is heated by the exhaust gases of the turbine 4, while the other such flow passes through the recuperator 9′ which has parallel water screen tubes 37 for protecting the walls of the combustion chamber 33; such walls are shown on only one side of the combustion chamber 33 in order to keep the drawing simple. The steam and water mixture issuing from the recuperators 9, 9′ passes to the screens 38 of the combustion chamber 25; the screens 38 extend along the superheater or resuperheater and form the horizontal tube curtain 38' above the level of the burners 5 to prevent the same from heating the tube bundle of the recuperator 9' by radiation. If desired, the same steam and water mixture can flow in parallel into the screens 39 of the combustion chamber 14. The slightly superheated steam leaving the screens 39 passes through the superheater 26, 26' before entering the steam turbine.

In normal conditions operation is identical to what is shown in FIGURE 2. That proportion of the exhaust gases of the recirculating turbine 15 which is not sucked by the compressor 13 through the recuperator 9' forms the return flow of the half-closed circuit and is heated by the burners 5.

When the recirculation group 17, 13, 15, 22 is inoperative and there is no fuel being supplied to the burners 16, the burners 34 are operated by being supplied with sufficient air and fuel for the water flowing through the recuperator 9' to receive the same amount of heat as in normal operation. Since the required combustion gas flow is much less than the amount associated with normal operation in the recuperator 9', the combustion gas reaches the mixing chamber 27 at a temperature slightly above the steam saturation temperature and replaces the return gas flow of the half-closed circuit in the mixture. The air and fuel flow to the burners 16 which were mainly used on normal operation to heat the closed-circuit gases is therefore transferred to the burners 34 and partly to the burners 2 and 5.

The air flow through the compressor 17, chamber 14, compressor 13 and turbine 15 is bound to be very low because of the load loss in the burners, but this is not a disadvantage since this air returns to the generator 3 where it participates in the combustion.

If the combustion chamber 14 is devoid of water screens, the heat supplied to the steam in the generator 3 remains substantially unchanged on emergency operation and the superheat can be maintained without any great change of the temperature in the combustion chamber 25 if the excess of air therein is increased. This increased excess air replaces the gas flow which entered via the place 31 on normal operation; also, the excess of air increases naturally since the total flow of air in the compressor 1 stays constant.

If the combustion chamber 14 has water screens, the heat used to evaporate the water on normal operation is reduced in the generator 3. Conveniently, the temperature in the combustion chamber should then be relatively low, to which end the supply of gas via the element 31 is increased and refractory linings are used to limit the temperature of the metal forming the screen superheater tubes. The temperature in the chamber 25 is therefore higher during emergency operation than during normal operation, but the temperature of the tubes is not excessive and the superheat can be maintained if in normal operation the heat absorbed by the water in the chamber 14 does not exceed from 30 to 35% of the heat supplied to the water in the generator 3.

If the turbine or the compressors of the recirculation group become moderately coked up to an extent not requiring stoppage of the group, all that happens is that the recirculation flow and the power are reduced. The water contents of the steam and water mixture supplied to the generator 3 increase slightly. Consequently, if slightly more fuel is injected into the burners 2, 5 and slightly less fuel is injected into the burners 16, the steam turbine and the ordinary gas turbine group 1, 4, 6 will still operate at normal power; the superheat or the resuperheat can be maintained by appropriate control of the supplies of gas via the headers 31 and 32.

For a repair or a complete cleaning requiring dismantling of the turbine 15 or compressors 17, 13, the entire installation must be stopped, but this job can be put off until a time when power production is less important (week-end); at dismantling solid caps can be placed on the connecting flanges of the piping to the machines so that the plant can run on an emergency basis while being repaired.

Figure 4:
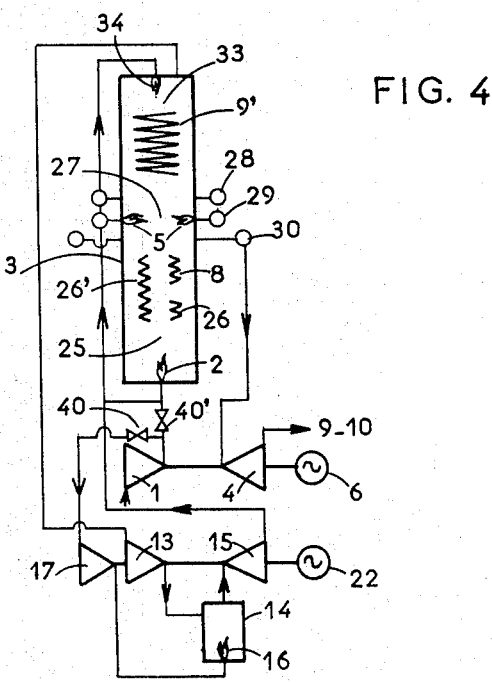
FIGURE 4 is a diagram of a variant wherein the entire air flow is introduced into the half-closed cycle.

The efficiency of the cycle just described can be further improved if all the air which is compressed by the compressor 1 is supplied to the combustion chamber 14 in the manner illustrated in FIGURE 4. Combustion in the chamber 14 is then effected with a large excess of air and the still oxygen-rich gases which are expanded in the turbine 15 are supplied to the burners 2, 5 and—as previously so far as the part associated with the closed cycle is concerned—to the input of the recuperator 9' whose injection tubes in the chamber 27 must have load losses equivalent to the load losses of the burners 5.

In this form of the invention, however, if it is required to be able to stop the group 17, 13, 15, 12 when the remainder of the installation is in operation, valves 40, 40' must be provided, the valve 40 being open and the valve 40' being closed on normal operation and vice versa for emergency operation. As previously, on emergency operation some of the air is supplied to the burners 34; also, if the chamber 14 has water screens it is advisable to use a relatively low temperature in the chamber 25 for normal operation and to increase such temperature on emergency operation. Superheating and resuperheating are controlled by inverse variation of the excess of air to the burners 2, 5, instead of this cotnrol being by gas injection.

This second form of the invention can be considered as residing in the recycling circuit 13–15, 27, 9', 33, 13 being superimposed upon the resuperheat cycle 1, 17, 14, 15, 27, 4, 9, 10, 12, for this latter cycle is passed through by all the air which the efficiency improves despite the decrease in the specific heat of the gases expanded in the turbine 15, such decrease being offset anyway by a possible increase of the factor K.

Because of the improved efficiency, this second form of the invention, hereinafter briefly referred to as the "second form," may be preferable to the "first form" although slightly less flexible than the latter, since when the recirculation group is stopped the burners 2, 5 must be changed over from gas feed to air feed and the flow of gas entering the chamber 27 through the header 28 must be controlled. Also, in a large-power installation comprising two groups 1, 4 in parallel with one stopped for maintenance, with the "second form"—unlike the first form—the plant cannot continue to operate on half-load by the group 17, 13, 15 being left in operation, for since all the air passes through the compressor 17, the same cannot deal with half the flow through it at the same intake pressure, whereas in the first form the flow through the compressor 17 is something like 50% or less of the total flow and so the compressor 17 can still operate on half-load. In this latter event, since the steam turbine runs on half-load and the recirculation flow decreases because of the increased temperature at the entry of the compressor 13, less fuel is injected into the chamber 14 and the exhaust gases can serve as combustion support in the burners 2, 5. However, the valves 40, 40' must then be provided.

Figure 5:
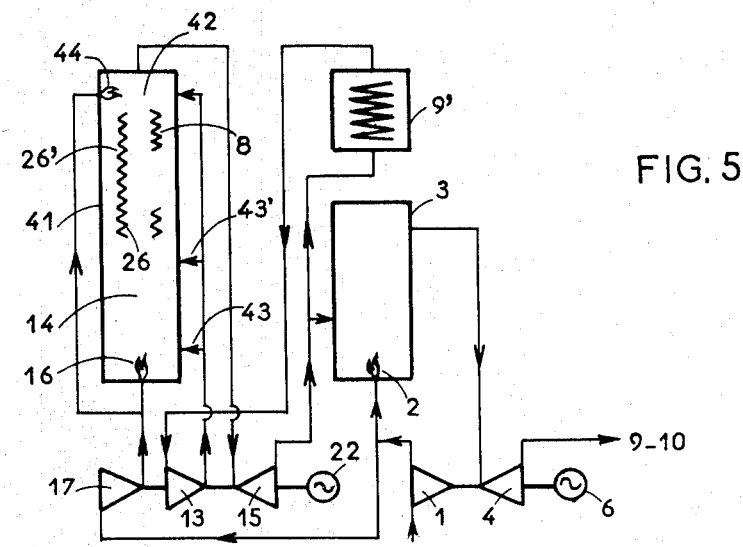
FIGURE 5 is a diagram of a variant wherein the main steam production is in the high-gas-pressure steam generator forming part of the half-closed cycle.

If there is very little chance of the recirculation group coking up, as is the case when natural gas is used, and if it is not required to use the remainder of the plant when the recirculation group is not available, then, as shown in FIGURE 5, the superheaters 26, 26' and the resuperheater 8 can be transferred to a high-pressure-gas generator 41 which replaces the combustion chamber 14; the generator 3 then becomes merely a combustion chamber which may or may not be cooled by water screens.

In this case the generator 41 has a chamber 42 in which the gases which have passed through the superheater or resuperheater are mixed with the closed-circuit gas flow delivered by the compressor 13. Post-combustion burners 44 heat the mixture to an appropriate temperature for entry into the turbine 15. Variable proportions of the gas delivered by the compressor 13 can enter the base 43 or top 43′ of the combustion chamber for control of superheating or resuperheating. The recuperator 9′ may or may not be embodied in the generator 3 and is shown separately in FIGURE 5.

Transferring the superheaters 26, 26′ and the resuperheater 8 to the high-pressure-gas steam generator 41 improves the efficiency of the "first form" since the amount of air entering the generator 41 is increased. Such transfer also improves the efficiency of the "second form" but not to the same extent, since the reduction in the excess of air is accompanied by a reduction in the factor K. Also, combustion may be poor in the combustion chamber 3 since the gases enter the same with a relatively small excess of air and leave it with very little excess of air—some 10%. In this variant, therefore, the "first form" may be preferable although its efficiency, less possible losses due to unburnt ingredients, may be slightly lower.

Figure 6:
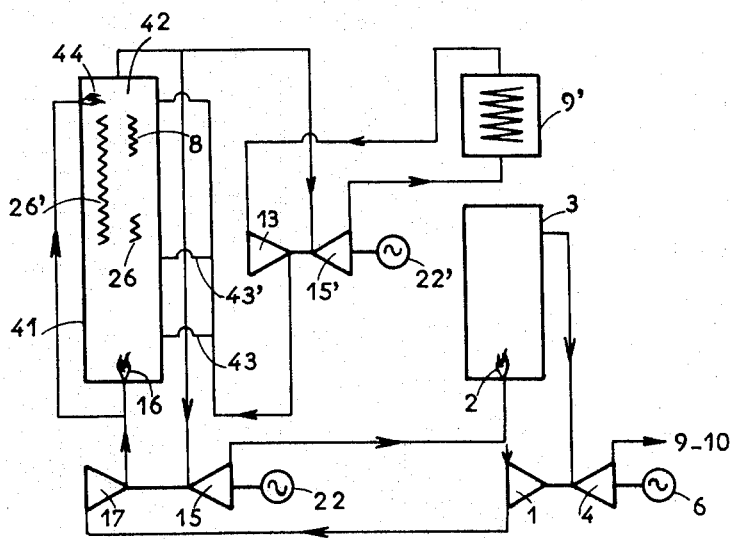
FIGURE 6 is a diagram of a variant wherein the turbine in which the recirculated gases are expanded is separate from the ordinary gas turbine.

As FIGURE 6 shows, with the "second form," if the second circuit is given a special turbine 15′ which drives the compressor 13 and an electric generator 22′ and which is separate from the turbine 15 in which only the gas flowing to the generator 3 is expanded, the optimum pressure, which may be slightly different from the optimum pressure of the generator 3, can be used in the closed circuit in the recuperator 9′.

The "second form" is also of use in cases where the combustion chamber 3 in FIGURE 6 is omitted and the generator 41 is the only steam generator. In such a case, the exhaust gases of the turbine 15 are at a pressure near atmospheric pressure and pass directly to the low-pressure recuperators 9, 10.

In all the systems hereinbefore described except the system illustrated in FIGURE 6, the air compressor 17 and the recirculation compressor 13 can be combined in a single body, in which case the air is mixed with the recirculated gases. However, this leads to a slight pressure loss since the requisite compression ratios are not completely the same because of varying load losses in the circuits. Also, in the "first form" it is preferable for the burners to be supplied with fresh air and therefore by a separate compressor. It has so far been assumed throughout that the ordinary gas group 1, 4 and the recirculation group 17, 13, 15 each has its own electric generator. Of course this is necessary if it is required to be able to operate the installation when one of the machines 17 or 13 or 15 is unavailable. If this feature is not required, an electric generator can be kept on only one of the groups, the powers of the compressors and turbines of the other group being balanced.

Figure 7:
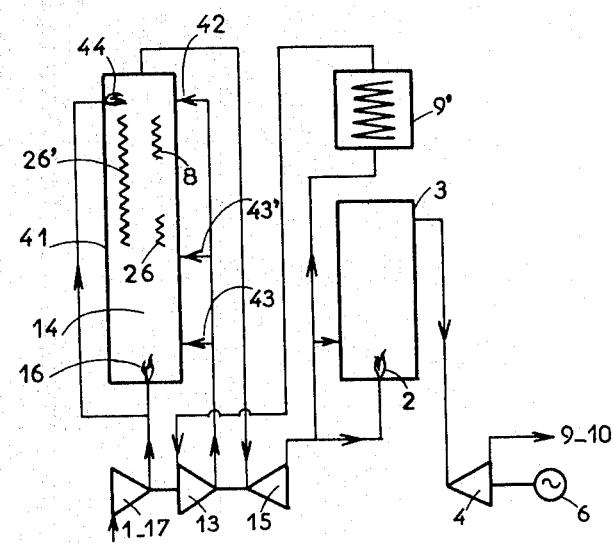
FIGURE 7 is a diagram showing a two-shaft-line grouping of compressors and turbines.

In this connection there are many possibilities of using two-shaft-line machines, and the invention is of use with any such system, for instance, the system illustrated in FIGURE 7 which relates to the "second form." In this system the two compressors 1, 17 are combined in a single body and are coupled with the recirculation compressor 13 and turbine 15, the power of the turbine 15 possibly balancing the power of the two compressors. The low-pressure turbine 4 therefore is the only element driving the electric generator 6.

If the invention is used not with the simple unresuperheated gas cycle as hereinbefore described but in a resuperheat cycle, all the features of the invention remain the same except that the generator 3 becomes the medium-pressure gas generator and the generator 14 becomes the high-pressure-gas generator. The invention is of use in its first and second forms and in the variants illustrated in FIGURES 5 and 6. One other difference is that an air cooler must be added before the compressor 17 since the temperature of the air compressed by the compressor 1 is greater. The provision of such an air cooler in the simple cycle application would be uneconomic. Like the recirculating gas, the air cooler is cooled by the condensed turbine water; consequently, since recuperator capacity is limited, the factor K drops, for instance, possibly to 1 instead of 1.4, in the "first form." However, the efficiency advantage of recirculation is still considerable.

Figure 8:
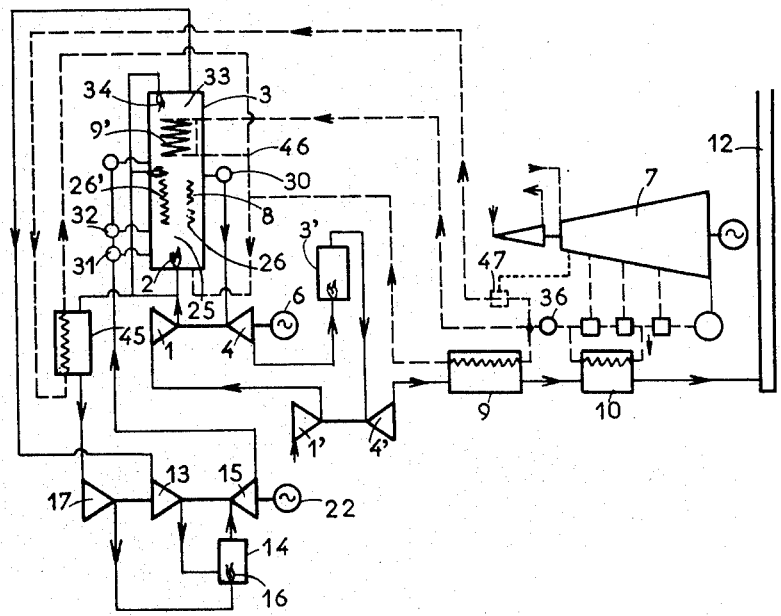
FIGURE 8 is a diagram showing how the invention can be used in an ordinary gas resuperheat cycle.

FIGURE 8 illustrates by way of example how the invention can be applied in its "first form" to the resuperheat cycle. The same comprises the low-pressure compressor 1′, the medium-pressure compressor 1, the medium-pressure generator 3, the medium-pressure turbine 4, the medium-pressure generator or simple combustion chamber 3′, and the recuperators 9, 10. It is assumed in FIGURE 8 that the low-pressure group 1′, 4′ is balanced without any electric generator, the compression ratios being appropriately distributed accordingly between the compressors 1 and 1′. As in the previous cases, the closed cycle comprises the compressor 13, the generator or simple combustion chamber 14, the turbine 15 and the recuperator 9′. Some of the air compressed by the compressor 1 flows through the air cooler 45 before reaching the intake of the compressor 17. The air cooler 45 is cooled by a bypass of the condensed water delivered by the feed pump, the bypassed water returning to the exit of the recuperator 9′ and mixing at a place 46 with the steam and water mixture delivered by the recuperator 9′. The water screen, superheater feed and resuperheater feed system is not shown in order not to overload FIGURE 8 but is identical with what can be seen on the right-hand side of FIGURE 3, except that a water screen can be added in the low-pressure chamber 3′, such water screen being placed in parallel with the water screens of the chamber 25, of the generator 3 and of the chamber 14.

It will be assumed for simplification that the air is cooled in the cooler 45 to a temperature near to the temperature of the gases recirculated in the recuperator 9′; however, since optimum efficiency may correspond to different cooling temperatures, the cooling water of the cooler 45 can be derived after a different preheater of the turbine, for instance, after the fourth preheater 47 as shown in chain line.

The invention is of use in exactly the same way in a basic cycle comprising two or more resuperheats, in which case the system 45, 17, 13–15, 9′ is, as in FIGURE 8, added to the basic cycle. However, the basic cycle then comprises coolers between the high-pressure compressors, and above a predetermined number of resuperheats the preheating of the condensed water is saturated by the coolers so that the process ceases to operate.

What I claim is:
1. Power producing installation comprising steam activated power producing apparatus, at least one power-producing gas turbine arranged in an open gas cycle, steam generator means taking in feed water and supplying steam to said steam activated power producing apparatus, enclosure means for said steam generator means, air compressor means arranged for pressurising said enclosure means, means for producing exit gases from said enclosure means, and a half-closed cycle connected to said open gas cycle, said half-closed cycle comprising a compressor, a turbine for driving said compressor and for producing power, at least one recuperator for cooling the exhaust gases from said turbine with some of the feed water for said steam generator means, said recuperator being connected for recycling said cooled exhaust gases to said compressor, said recycling comprising the closed part of said half-closed cycle, a combustion chamber for heating the cooled gases before they are expanded in said turbine, burners in said combustion chamber, means for supplying compressed air to said burners which compressed air comprises the entry flow of said half-closed cycle, the delivery flow from said half-closed cycle comprising a part of the gases of said half-closed cycle being diverted at the intake of said recuperator and introduced into the exit gases from said steam generator means before introduction of the mixture of gases into the turbine of said open cycle.

2. Power producing installation as described in claim 1, said steam activated power producing apparatus being a steam turbine.

3. Installation as described in claim 1, the entry flow into said half-closed cycle being comprised by at least a proportion of the delivery from the compressor of said open cycle, means for compressing said delivery to a higher pressure before supplying said burners of the combustion chamber of said half-closed cycle and after-combustion burners for heating said mixed gases before being expanded in said power producing gas turbine.

4. Installation as described in claim 1, said recuperator of said half-closed cycle being disposed within said enclosure means for said steam generator means and including auxiliary burners supplied with air by said open cycle compressor means for heating the water flowing through said recuperator when the compressor-turbine group of said half-closed cycle is stopped.

5. Installation as described in claim 1, said burners of said combustion chamber of said half-closed cycle receiving the entire air delivery of the open-cycle compressor means under increased pressure from said compressor of said half-closed cycle with a proportion of the exhaust gases of said gas turbine of said half-closed cycle passing through said recuperators and the remainder of the exhaust gases of said gas turbine supporting combustion in said burners of said steam generator means.

6. Installation as described in claim 1 comprising a cycle having at least one gas resuperheater and cooling means receiving a proportion of the feed water for cooling the air to said compressor supplying air to said burners of said half-closed cycle.

References Cited by the Examiner

UNITED STATES PATENTS

| | | | |
|---|---|---|---|
| 2,543,677 | 2/1951 | Traupel | 60—49 X |
| 2,633,707 | 4/1953 | Hermitte | 60—49 |
| 2,663,144 | 12/1953 | Nordstrom | 60—39.18 |
| 3,159,970 | 12/1964 | Spillman | 60—39.18 |

MARK NEWMAN, *Primary Examiner.*

RALPH D. BLAKESLEE, *Examiner.*